UNITED STATES PATENT OFFICE.

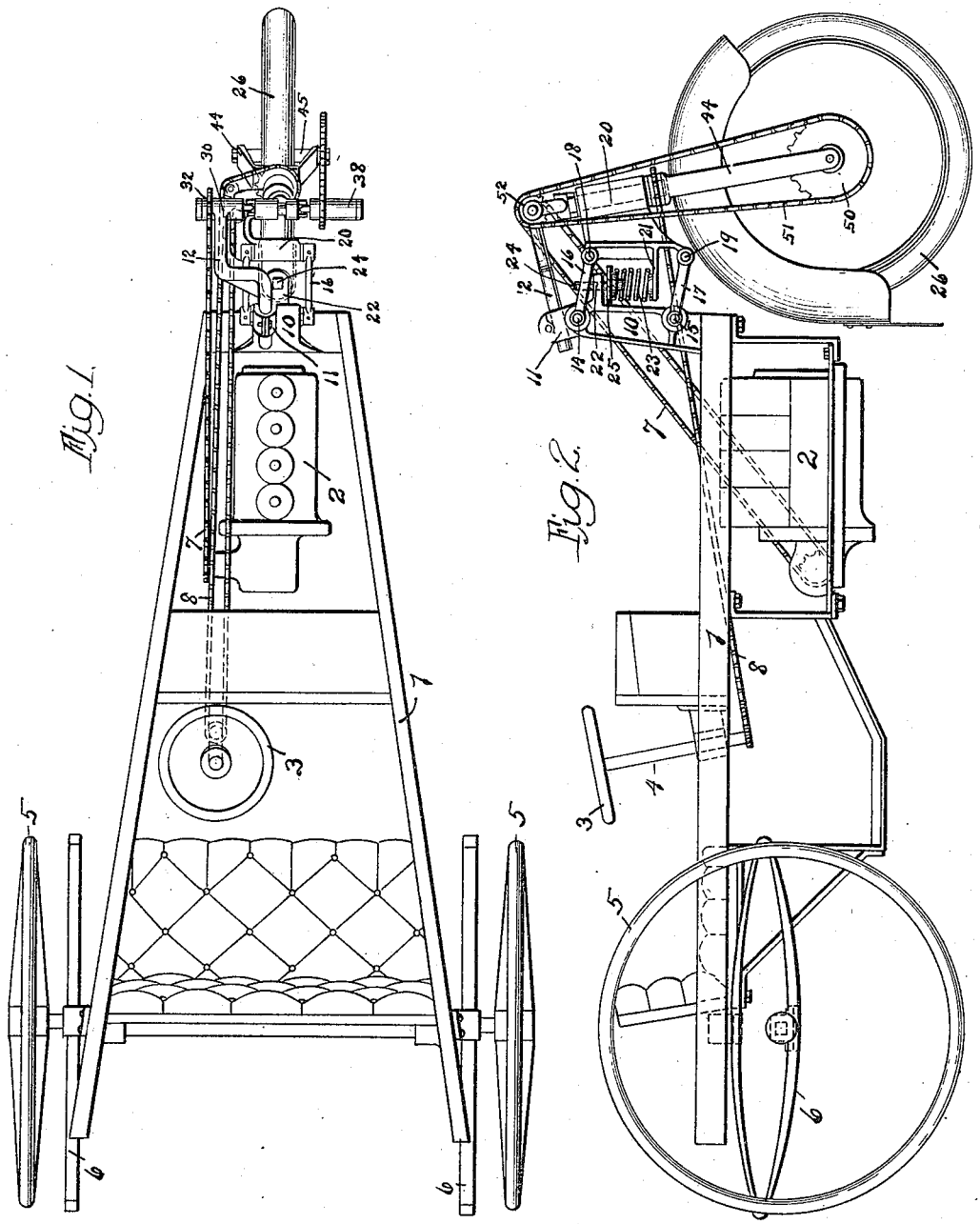

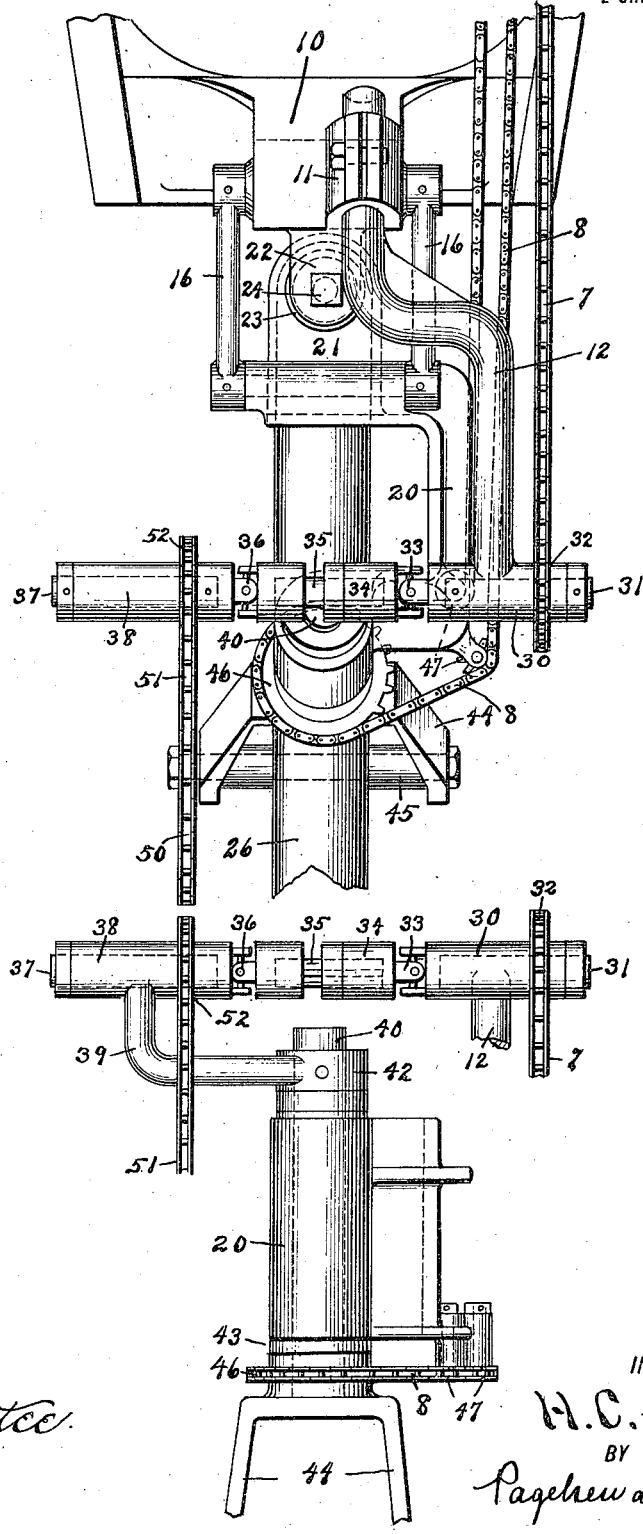

HENRY COLLIER SMITH, OF DETROIT, MICHIGAN.

MOTOR-VEHICLE.

1,237,714.　　　　Specification of Letters Patent.　　Patented Aug. 21, 1917.

Application filed November 13, 1916.　Serial No. 130,935.

*To all whom it may concern:*

Be it known that I, HENRY COLLIER SMITH, a citizen of the United States, and residing at Detroit, in the county of Wayne and State of Michigan, have invented a new and Improved Motor-Vehicle, of which the following is a specification.

This invention relates to means for turning and driving the traction wheels of motor vehicles, and its object is to provide a novel mounting for the traction wheel of a three-wheeled vehicle which permits relative vertical movement between the tractor wheel axle and the frame, and to provide a connection between the driving mechanism on the frame and the tractor wheel which shall permit the wheel to swing around an upright axis and move vertically relative to the frame.

This invention consists, in combination with the frame of a motor vehicle and the motor mounted thereon, of a head so mounted on the frame that it may move vertically relative thereto, of a steering post revolubly mounted in the head and a tractor wheel carried by the post, a bearing for a divided shaft carried by the frame and a bearing for the other portion of the shaft mounted on the post, a driving connection between these shafts permitting rotation and vertical movement of the post relative to the frame, means to drive one portion of the divided shaft from the motor, and means to drive the tractor wheel from the other portion of the divided shaft.

It further consists in forming the driving connection between the portions of the divided shaft of two universal couplings and a pair of telescoping members between the couplings so constructed that these members will turn together while at the same time permitting the couplings to separate or approach each other as the tractor wheel moves up and down or turns relative to the frame.

In the accompanying drawing Figure 1 is a plan and Fig. 2 is a side elevation of this improved driving and steering mechanism connected to a motor vehicle. Fig. 3 is a plan of the steering and driving mechanism on a larger scale. Fig. 4 is a front elevation thereof.

Similar reference characters refer to like parts throughout the several views.

In the drawings the frame 1, engine 2, steering wheel 3, steering shaft 4, hind wheels 5 and springs 6 may be of any desired construction, those in the drawings being merely shown conventionally. Power is transmitted to the front steering and driving wheel by means of the chain 7 and this wheel may be swung around by means of the steering chain 8.

Mounted on the front end of the frame 1 is a pedestal 10 which carries a clamping mechanism 11 for the arm 12, and which also carries pins 14 and 15 on which the links 16 and 17 are mounted to swing in vertical planes. In the outer ends of the links 16 and 17 are pins 18 and 19 carried by the head 20 in which the post of the front fork is mounted. This head 20 has a bracket 21, between which and the bracket 22 on the pedestal 10, is mounted a spring 23 which is adjustable by means of a screw 24 that presses against a washer 25. This spring will normally tend to hold the front wheel 26 down but will permit relative vertical movement between this front wheel and the front end of the frame 1. As the spring 23 is increasingly tensioned by the bolt 24, vertical movement of the wheel relative to the frame 1 is resisted to a greater extent.

The arm 12 which is carried by the clamp 11 supports a bearing 30 in its front end in which is mounted a short shaft 31, to which is connected a sprocket wheel 32 around which the chain 7 extends. On the inner end of this shaft 31 is a universal coupling 33 that connects to a sleeve 34 in which is telescoped a stem 35 that revolves with the sleeve. A second universal coupling 36 connects the stem 35 to the short shaft 37 which is revoluble in a bearing 38 carried by the arm 39 having a collar 42 secured to the post 40 of the fork of the wheel 26, which collar, together with the collar 43, prevents longitudinal movement of the post 40 within the head 20. The fork 44 extends down from the post 40 and the shaft 45 for the front wheel 26 is mounted between the lower ends of the fork.

Connected to the fork 44 is a sprocket wheel 46 around which the steering chain 8 extends. This chain also extends around idler wheels 47 carried by the head 20. A sprocket wheel 50 is connected to the shaft 45 of the wheel 26 and a chain 51 extends around this wheel 50 and around the wheel 52 on the shaft 37 shown in Fig. 4.

The operation of this device is as follows: The wheel 26 is driven by means of the chain 51 through the sprocket wheels 50 and 52. The wheel 26 is permitted considerable movement relative to the main frame of the machine by reason of the fact that two universal couplings 33 and 36 and a relatively endwise movable sleeve and stem 34—35 are interposed between the gears 32 and 52. Any vertical movement between the bearing 38 and 30 is therefore compensated for by the universal couplings 33 and 36 and by the sliding sleeve and stem 34—35. This arrangement permits vertical movement between the head 20 and the bracket 10, and between the head 20 and the arm 12.

As the sprocket wheel 46 is secured to the post 40 and the chain 8 extends to the steering wheel, the post 40 can readily be turned inside the head 20 through the action of the chain 8. The head 20 is off-set to the left (to the right in Fig. 3) to permit the wheel 26 to be swung to such a position that the shaft 37 will be practically parallel to the links 16, which would bring the wheel 52 between the post 40 and the bracket 10. This off-set of the head may be varied as desired to accommodate different sized driving mechanisms for the wheel 26. The object accomplished by the present structure is a flexible connection between the frame of the vehicle and the wheel 26 which permits the wheel to swing through an angle of one hundred and eighty degrees, which permits the wheel to move up and down relative to the frame, and at the same time gives full traction value for the power employed.

I claim:—

1. In a motor vehicle, the combination of a frame, a head, pairs of links connecting the head to the frame, a traction wheel and a fork in which it is rotatably mounted, a post at the upper end of the fork mounted in the head, a shaft for driving the wheel carried by said post, a second driving shaft mounted on said frame, and a flexible connection between said shafts.

2. In a motor vehicle, the combination of a frame and a motor thereon, a head, links connecting the head to the frame, a spring to resist the upward movement of the head relative to the frame, a traction wheel and a fork in which it is mounted, a steering post on the fork revolubly mounted in the head, a shaft carried by the frame, means for driving the shaft from the motor, a second shaft mounted on said post, a flexible connection between said shafts, and means to drive the traction wheels from said second shaft.

3. In a motor vehicle, the combination of a frame and a motor mounted thereon, a steering and driving wheel, a fork in which the wheel is rotatably mounted, said fork being rotatable on an upright axis, a steering head wherein the fork is rotatably mounted, links connecting said head and frame and permitting relatively vertical movements between them, and means whereby the motor may drive the wheel.

4. In a motor vehicle, the combination of a frame, a head, links connecting the head to the frame and permitting relative vertical movement, a post revolubly mounted in the head, a pair of revoluble shafts, one mounted on the frame and the other on the post, a pair of universal couplings and a slidable coupling connecting said shafts, a traction wheel carried by said post, means to turn said shafts and means whereby said shafts may revolve said wheel.

5. In a motor vehicle, the combination of a frame, a steering head, means connecting the head and frame and permitting relatively vertical movements between them, a driving shaft mounted on the frame, a driven shaft mounted on said head, a flexible connection between the shafts, a driving wheel, a support for the same rotatably mounted in said head, and means connecting the driven shaft to said wheel.

6. In a motor vehicle, the combination of a frame, a pair of horizontal pivots carried thereby, a steering and traction wheel and its shaft, a steering fork in whose lower end the steering wheel shaft is mounted, the upper end of said fork being cylindrical, a head in which the cylindrical portion of the fork is rotatably mounted, links connecting this head to the pivots on the frame, a bracket at the upper end of the fork and a horizontal bearing carried thereby, a shaft in said bearing, a driving mechanism between said shaft and the driving wheel, a bracket carried by the frame and a horizontal bearing carried thereby, a shaft in said bearing, an engine on the frame and a driving mechanism between the engine and the last named shaft, and a flexible connection between the two horizontal shafts.

7. In a motor vehicle, the combination of a frame, a pair of horizontal pivots carried thereby, a steering and traction wheel and its shaft, a steering fork in whose lower end the steering wheel shaft is mounted, the upper end of said fork being cylindrical, a head in which the cylindrical portion of the fork is rotatably mounted, links connecting this head to the pivots on the frame, a bracket at the upper end of the frame and a horizontal bearing carried thereby, a shaft in said bearing, a driving mechanism between said shaft and the driving wheel, a bracket carried by the frame and a horizontal bearing carried thereby, a shaft in said bearing, an engine on the frame and a driving mechanism between the engine and the last named shaft, and a flexible connection between the two horizontal shafts, comprising a pair of universal couplings and a pair of telescoping members between them.

8. In a motor vehicle, the combination of a frame, a steering and traction wheel, a steering fork in whose lower end the wheel is mounted, a head in which the upper end of the fork is rotatably mounted, horizontal bearings at the upper end of the fork and on the frame, shafts in said bearings, an adjustable driving mechanism between said shafts, a chain-drive mechanism between the shaft carried by the fork and the driving wheel, means including a chain drive mechanism for turning the shaft carried by the frame, and a yieldable connection between the head and frame.

9. In a motor vehicle, the combination of a frame, a steering and traction wheel, a steering fork in whose lower end the wheel is mounted, a head in which the upper end of the fork is rotatably mounted, horizontal bearings at the upper end of the fork and on the frame, shafts in said bearings, an adjustable driving mechanism between said shafts, a chain-drive mechanism between the shaft carried by the fork and the driving wheel, means including a chain drive mechanism for turning the shaft carried by the frame, and a yieldable connection between the head and frame comprising pairs of pivots carried by both frame and head and links connecting the pivots.

10. In a motor vehicle, the combination of a frame, a steering and traction wheel, a steering fork in whose lower end the wheel is mounted, a head in which the upper end of the fork is rotatably mounted, horizontal bearings at the upper end of the fork and on the frame, shafts in said bearings, an adjustable driving mechanism between said shafts, a chain-drive mechanism between the shaft carried by the fork and the driving wheel, means including a chain drive mechanism for turning the shaft carried by the frame, a rearwardly projecting arm on the head and a forwardly projecting arm on the frame, a compression spring between said arms, pivots mounted on the head and frame above and below the spring and links connecting said pivots.

11. In a motor vehicle, the combination of a frame, a steering and traction wheel, a steering fork in whose lower end the wheel is mounted, a head in which the upper end of the fork is rotatably mounted, a horizontal bearing at the upper end of the fork off-set laterally from the central line thereof an arm connected to the front end of the frame and off-set laterally from the longitudinal plane thereof in the opposite direction from the bearing on the fork, and a bearing at the forward end of the arm, shafts in said bearings and universal couplings at their inner ends, a pair of telescoping driving shafts connecting to said couplings, means to drive the shaft carried by the arm, and means to drive the wheel from the shaft carried by the fork.

12. In a motor vehicle, the combination of a frame, a steering and traction wheel, a steering fork in whose lower end the wheel is mounted, a head in which the upper end of the fork is rotatably mounted, horizontal bearings at the upper end of the fork and on the frame, shafts in said bearings, an adjustable driving mechanism between said shafts, a chain-drive mechanism between the shaft carried by the fork and the driving wheel, means including a chain drive mechanism for turning the shaft carried by the frame, a yieldable connection between the head and frame, a sprocket wheel attached to said fork below the head, a steering shaft and sprocket wheel mounted on the frame, and a sprocket chain connecting the sprocket wheels.

HENRY COLLIER SMITH.

Copies of this patent may be obtained for five cents each, by addressing the "Commissioner of Patents, Washington, D. C."